United States Patent [19]

Jones, Jr.

[11] 4,219,855
[45] Aug. 26, 1980

[54] THIN FILM MAGNETIC HEAD

[75] Inventor: Robert E. Jones, Jr., San Jose, Calif.

[73] Assignee: International Business Machines Corporation, Armonk, N.Y.

[21] Appl. No.: 972,102

[22] Filed: Dec. 21, 1978

[51] Int. Cl.² .......................... G11B 5/22; G11B 5/20; G11B 5/60
[52] U.S. Cl. .................................. 360/125; 360/119; 360/123; 360/103
[58] Field of Search .............................. 360/125–127, 360/122–123, 119–120, 102–103

[56] References Cited

U.S. PATENT DOCUMENTS

| Re. 29,326 | 6/1977 | Lazzari et al. | 360/123 |
| 3,639,699 | 2/1972 | Tiemann | 360/126 |
| 3,700,827 | 10/1972 | Nagao | 360/125 |
| 3,987,488 | 10/1976 | Kanai et al. | 360/123 |
| 4,081,846 | 3/1978 | Roscamp | 360/103 |

Primary Examiner—Alfred H. Eddleman
Attorney, Agent, or Firm—Nathan N. Kallman

[57] ABSTRACT

A thin film magnetic transducer comprises a non-magnetic substrate and a pair of magnetic pole pieces having different widths. The width of the first pole piece deposited on the substrate is greater than that of the second pole piece to prevent a problem associated with misregistration between the pole pieces, which may occur during manufacture. Such misregistration generally results in a "wraparound", so that the edge of the second pole piece would have an extended portion forming an angle to the normal magnetic transitions created by the pole pieces. The width of the second pole piece is slightly less than the effective width of the data track recorded on a magnetic medium, and the data track width is relatively independent of the dimension of the first pole piece.

10 Claims, 3 Drawing Figures

THIN FILM MAGNETIC HEAD

TECHNICAL FIELD

This invention relates to an improved thin film magnetic transducer for use with magnetic recording media and in particular to the structure of the pole pieces used in the transducer.

BACKGROUND ART

One of the problems associated with thin film inductive heads arises from the need to deposit a second magnetic pole piece relative to a first magnetic pole piece previously deposited onto a substrate. If the width of the two pole pieces are made to be substantially equal, then any misregistration during the manufacturing processes of the transducer will produce a condition called "wraparound". Misregistration which may lead to a wraparound condition may be caused by operator error, defective masks, or non-ideal alignment tools, among other things. At the edges of the pole pieces where the wraparound occurs, the flux lines of the magnetic field produced between the two pole pieces will not be in the desired direction relative to the data track on a magnetic recording medium. Thus, during a write operation, the recording medium will not be properly magnetized at the area proximate to the wraparound, in a direction parallel to the direction of motion of the medium, but in a direction at an angle to the magnetic transitions developed by the pole pieces. This improper magnetization will not provide a significant readout signal during the read mode, particularly if the head is slightly misaligned during the read operation. In effect, the pole pieces cannot create or sense the magnetic transitions properly in the wraparound region of the pole pieces.

In some cases, particularly when the transducing gap between the pole pieces is specified to be very small, the adjacent pole pieces can magnetically short in the wraparound region, so that a proper magnetic field cannot be produced between the pole pieces. Sputtering techniques which are generally used to deposit the gap material typically leave the top corners of the first pole piece layer uncovered or with a relatively thin covering, particularly when the gap between the pole pieces is small.

CROSS-REFERENCE TO RELATED APPLICATION

In U.S. Pat. No. 4,130,847, entitled "Corrosion Resistant Thin Film Head Assembly and Method for Making," and assigned to the same assignee, a thin film head assembly and method are disclosed, wherein a layer of passivation material is deposited over the pole tips to prevent corrosion.

SUMMARY OF THE INVENTION

An object of this invention is to provide a thin film magnetic transducer with an improved capability for reading and writing.

In accordance with this invention, a thin film magnetic transducer has two pole pieces that form a magnetic circuit. A first pole piece of predetermined dimensions, i.e., width, thickness and throat height, is deposited on a nonmagnetic substrate. After deposition of the transducer gap material, insulation, and electrical coil structure, a second pole piece having a specified width less than that of the first pole piece is deposited. The width of the second pole piece is determinative of the effective width of the data track recorded on a recording medium.

The design of this invention takes into consideration the variations which may occur during fabrication in the widths of the pole piece layers (designated as P1W and P2W respectively). To ensure that wraparound will occur with a frequency less than 1.5 parts per 1000 fabricated, the mean width dimensions of the pole piece layers P1 and P2 obey the relationshp:

$$\frac{\overline{P1W} - \overline{P2W}}{2} \geq \left[ \left( \frac{3\sigma(P1W)}{2} \right)^2 + \left( \frac{3\sigma(P2W)}{2} \right)^2 + \left( \frac{3\sigma(MR)}{2} \right)^2 \right]^{\frac{1}{2}}$$

where $3\sigma$ is the three sigma variation, i.e., three standard deviations from the norm, and MR is the amount of misregistration as measured between the center lines bisecting each pole piece.

Furthermore, the width of the p1 pole piece should not be so large when compared to the centerline to centerline spacing of tracks so as to experience fringing effects or the readout of data from adjacent tracks.

BRIEF DESCRIPTION OF THE DRAWING

The invention will be described in greater detail with reference to the drawing in which.

Figure 2:
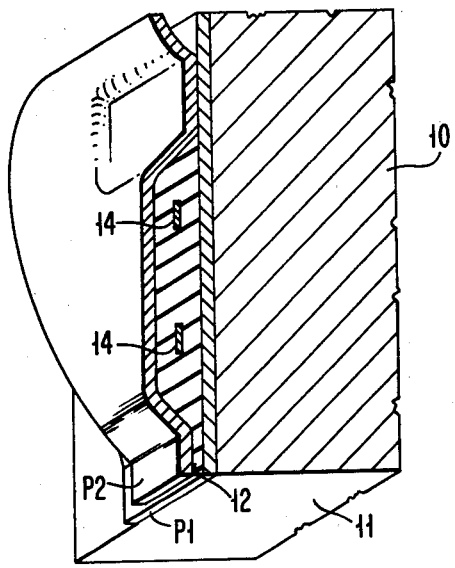
FIG. 2 is a sectional view of a basic thin film head structure, cut away through the center, illustrating the relationship of the two magnetic pole pieces formed in accordance with this invention.

It should be noted that some dimensions, such as thicknesses, of the several layers illustrated in FIG. 2 are not necessarily to scale.

DESCRIPTION OF THE INVENTION

Figure 1:
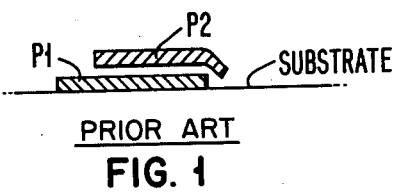
FIG. 1 is a sectional view of two magnetic pole pieces representing the wraparound condition found in prior art thin film head structures.

FIG. 1 illustrates a prior art relationship of pole pieces P1 and P2 having a wraparound condition. This arrangement suffers from the aforementioned problems of improper magnetization during writing and decreased signal on reading, and is subject to shorting and other deleterious effects.

In accordance with this invention, FIG. 2 depicts a preferred configuration, which includes a pole piece P1, that is deposited on a nonmagnetic substrate 10. The substrate has been prepared by polishing and cleaning to afford a good adhesion surface for the pole piece layer P1. The substrate also provides an air bearing surface 11 which affords flying the transducer assembly over a rotating magnetic disk, by way of example. The pole piece P1 is preferably made of a nickel-iron material, generally known as Permalloy. The P1 layer is formed of a uniform specified thickness, in the range of 2 to 3 microns. During deposition, the thickness is controlled to be within 10% of the specified thickness. The width of the P1 pole piece layer is formed to be in the range of 25 to 200 microns.

After deposition of the first pole piece layer P1, an insulating layer 12 and coil structure including an electrical conductor pattern represented by blocks 14 are formed over the layer P1. Subsequently, a second pole piece layer P2 of Permalloy is deposited. The P2 pole piece layer has a width of about 35 microns, which is less than that of the P1 layer. The P2 pole piece layer is spaced from the P1 pole piece layer by the thickness of the insulating layer 12, which may have a thickness of about one micron at the effective gap area along the air bearing surface 11 of the substrate 10. The major portion of the P2 pole piece layer is disposed substantially parallel to the P1 pole piece layer. This desired parallelism is realized by controlling the uniformity of thickness of the layers being deposited.

The P1 and P2 pole pieces enclose the transducing gap formed by the insulating layer 12. The effective transducing portion of the nonmagnetic gap is located at the air bearing surface 26 of the substrate 10, which surface flies over a record medium such as a rotating magnetic disk (not shown).

Figure 3:
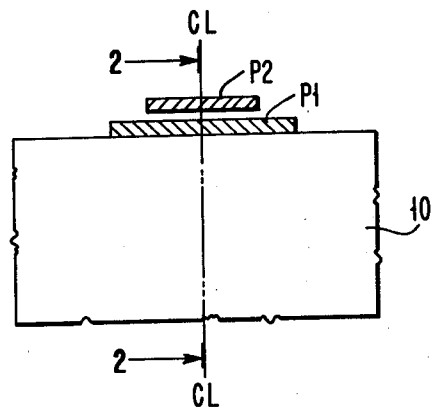
FIG. 3 is a sectional view of the two magnetic pole pieces depicted in FIG. 2, showing the relationship of the widths of the pole pieces.

In keeping with this invention, the P1 and P2 pole piece layers are virtually centered relative to a centerline CL which bisects the layers, as depicted in FIG. 3. The ends of the P2 pole piece layer are displaced towards the centerline relative to the extremities of the P1 pole piece.

In each of the deposition processes, a patterned mask is employed that delineates the location and predetermines the configurations of the layer, including width dimensions. The thicknesses of the layers are controlled by the deposition process, which may be chemical etching, sputter etching or plating, as is known in the art. By means of the mask design and the deposition process, control of the configuration of each layer is possible, so that proper spacing, parallelism, thicknesses and widths of the pole piece layers are suitably achieved.

By virtue of the lesser width of the P2 pole piece layer, which may be about 10% less in width than that of the P1 pole piece layer, wraparound problems are avoided.

It should be understood that the invention is not limited to the specific dimensions or materials designated above. Basically, the preferred widths of the pole pieces P1 and P2 should satisfy the relationship recited supra.

What is claimed is:

1. A thin film magnetic head assembly comprising:
   a nonmagnetic substrate having an air bearing surface;
   a first pole piece layer having a predetermined width at one end deposited on said substrate;
   a nonmagnetic material deposited on said first pole piece layer to form a transducing gap;
   a second pole piece layer deposited on said nonmagnetic material having a width at one end less than that of said first pole piece, said width dimension being determinative of the width of the recorded data track, said one ends of said pole piece layers being disposed in a common plane with said air bearing surface, said pole piece layers being coextensive and centered relative to a centerline which bisects said layers.

2. A thin film magnetic head assembly as in claim 1, including electrically conductive means disposed adjacent to and between said pole piece layers.

3. A thin film magnetic head assembly as in claim 1, wherein the width of said first pole piece layer is greater than that of said second pole piece layer by less than 15%.

4. A thin film magnetic head assembly as in claim 1, wherein the width of said first pole piece is about 40 microns, and the width of said second pole piece is about 35 microns.

5. A thin film magnetic head assembly as in claim 1, wherein said pole piece layers are substantially parallel.

6. A thin film magnetic head assembly as in claim 1, wherein the thicknesses of said pole piece layers are substantially the same.

7. A thin film magnetic head assembly as in claim 6, wherein said thicknesses are in the order of 2 to 3 microns.

8. A thin film magnetic head assembly as in claim 1, wherein the thickness of said gap material is about 1 micron.

9. A thin film magnetic head assembly as in claim 1, wherein said pole piece layers are formed from Permalloy.

10. A thin film magnetic head assembly, as in claim 1, wherein said pole piece layers P1 and P2 obey the relationship:

$$\frac{P1W - P2W}{2} \geq \left[\left(\frac{3\sigma(P1W)}{2}\right)^2 + \left(\frac{3\sigma(P2W)}{2}\right)^2 + \left(\frac{3\sigma(MR)}{2}\right)^2\right]^{\frac{1}{2}}$$

where $3\sigma$ is the three sigma variation, MR is the amount of misregistration as measured between the centerline bisecting said pole piece layers, and P1W and P2W are the widths of the respective pole piece layers.

* * * * *